United States Patent
Eroglu et al.

(10) Patent No.: US 10,124,534 B2
(45) Date of Patent: Nov. 13, 2018

(54) ADHESIVE AID AND METHOD FOR ADHERING COMPONENTS

(71) Applicant: Bayerische Motoren Werke Aktiengesellschaft, Munich (DE)

(72) Inventors: Oguzhan Eroglu, Biberach (DE); Michael Brauch, Baldham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 493 days.

(21) Appl. No.: 14/931,927

(22) Filed: Nov. 4, 2015

(65) Prior Publication Data

US 2016/0052195 A1    Feb. 25, 2016

Related U.S. Application Data

(63) Continuation of application No. PCT/EP2014/063278, filed on Jun. 24, 2014.

(30) Foreign Application Priority Data

Jul. 18, 2013  (DE) .................. 10 2013 214 102

(51) Int. Cl.
  *B29C 65/48*   (2006.01)
  *B29C 65/00*   (2006.01)
  (Continued)

(52) U.S. Cl.
  CPC .......... *B29C 65/48* (2013.01); *B29C 66/0042* (2013.01); *B29C 66/1122* (2013.01);
  (Continued)

(58) Field of Classification Search
  CPC .................................................... B29C 65/48
  (Continued)

(56) References Cited

U.S. PATENT DOCUMENTS 3,025,991 A * 3/1962 Gillon .................. B65D 51/241
                                                        215/311
3,029,486 A    4/1962 Raymond
                     (Continued)

FOREIGN PATENT DOCUMENTS

CN          102165186 A     8/2011
DE    10 2006 036 931 A1    2/2008
                (Continued)

OTHER PUBLICATIONS

International Search Report (PCT/ISA/210) issued in PCT Application No. PCT/EP2014/063278 dated Oct. 23, 2014 with English translation (six pages).

(Continued)

*Primary Examiner* — Jeffry H Aftergut
(74) *Attorney, Agent, or Firm* — Crowell & Moring LLP

(57) ABSTRACT

An adhesive aid and a method for adhering components by use of an adhesive are provided. The adhesive can be found in an adhesive gap between respective adhesive surfaces of the components. At least the first component has an opening which opens into the component adhesive surface. The adhesive aid has an insert portion, which is designed to be inserted into the opening and has an insert outer contour that correlates to an inner contour of the opening, and a displacement portion, which adjoins the insert portion in order to displace adhesive in the adhesive gap. The displacement portion has a protrusion which protrudes past the insert outer contour in the radial direction, and the displacement portion is designed to be flexible, in particular elastic, at least in the region of the protrusion.

20 Claims, 2 Drawing Sheets

(51) Int. Cl.
*F16B 11/00* (2006.01)
*B29L 31/00* (2006.01)
*B29C 65/78* (2006.01)

(52) U.S. Cl.
CPC ............ *B29C 66/45* (2013.01); *F16B 11/006* (2013.01); *B29C 65/7826* (2013.01); *B29C 66/324* (2013.01); *B29C 66/7212* (2013.01); *B29C 66/72141* (2013.01); *B29C 66/72143* (2013.01); *B29C 66/742* (2013.01); *B29C 66/7487* (2013.01); *B29C 66/8122* (2013.01); *B29L 2031/737* (2013.01)

(58) Field of Classification Search
USPC .......................................... 156/60, 295, 289
See application file for complete search history.

(56) References Cited

U.S. PATENT DOCUMENTS

| | | | | |
|---|---|---|---|---|
| 4,636,275 A | * | 1/1987 | Norell | H01L 21/4857 100/211 |
| 4,643,935 A | * | 2/1987 | McNeal | H01L 21/4803 257/E23.007 |
| 4,680,075 A | * | 7/1987 | McNeal | H01L 23/13 156/286 |
| 4,697,717 A | * | 10/1987 | Grippi | B01L 3/50825 215/354 |
| 4,737,208 A | * | 4/1988 | Bloechle | H01L 21/4857 156/289 |
| 5,116,440 A | * | 5/1992 | Takeguchi | B32B 37/0023 156/289 |
| 5,421,471 A | * | 6/1995 | Burgan | B65D 39/00 215/355 |
| 6,189,573 B1 | * | 2/2001 | Ziehm | F16L 55/1141 138/104 |
| 2011/0142663 A1 | | 6/2011 | Gill | |

FOREIGN PATENT DOCUMENTS

| | | |
|---|---|---|
| DE | 2007 062 459 A1 | 6/2009 |
| DE | 10 2007 062 087 A1 | 7/2009 |
| EP | 2206654 A1 * | 7/2010 |
| FR | 2 953 260 A1 | 6/2011 |

OTHER PUBLICATIONS

German Search Report issued in corresponding German Application No. 10 2013 214 102.5 dated Feb. 17, 2014 with partial English translation (10 pages).

Chinese-language Office Action issued in counterpart Chinese Application No. 201480028946.7 dated May 25, 2016 with English translation (Twelve (12) pages).

* cited by examiner

ADHESIVE AID AND METHOD FOR ADHERING COMPONENTS

CROSS REFERENCE TO RELATED APPLICATIONS

This application is a continuation of PCT International Application No. PCT/EP2014/063278, filed Jun. 24, 2014, which claims priority under 35 U.S.C. § 119 from German Patent Application No. 10 2013 214 102.5, filed Jul. 18, 2013, the entire disclosures of which are herein expressly incorporated by reference.

BACKGROUND AND SUMMARY OF THE INVENTION

The present invention relates to an adhesive aid and to a method for adhering components. In particular, the invention relates to an adhesive aid for the adhering of planar components, at least one component having an opening.

When joining components by adhesion, particularly planar components, it is problematic that, during the joining of the components, if one of the components has openings, such as holes, bores, cutouts, punch holes, etc., adhesive may swell out into the openings and, through these openings, may swell out by way of a component surface. As a result, pre-machining and finishing may be made more difficult or additionally required, such as, for example, a removal of excess adhesive, an exposing of the joint, a metering of the adhesive quantity, a marking of the joining location, etc.

It is an object of the present invention to provide a method and adhesive aid for adhesively joining components, of which at least one has an opening, while at least partially avoiding the disadvantages of the prior art. In particular, it is an object of the present invention to avoid adhesive flow out into openings of components, when joining by adhesion. It is a further object of the present invention to avoid or at least reduce pre-machining and finishing when joining by adhesion.

The above-mentioned object is achieved at least with respect to partial aspects by an adhesive aid and by a method according to embodiments of the invention. In this case, characteristics and details which are described in connection with the adhesive aid, also apply to the method as well as, in each case, vice-versa and reciprocally, so that, with respect to the disclosure, reference is made or can always be made reciprocally to the individual aspects of the invention.

According to one aspect of the present invention, an adhesive aid is provided for use during the adhesive joining of a first component with a second component by way of an adhesive situated in an adhesive gap between respective adhesive surfaces of the components. At least the first component has an opening which opens into its adhesive surface. The adhesive aid has an insert section designed to be inserted into the opening and having an outer insert outer contour, which correlates with the inner contour of the opening. The adhesive aid has a displacement section, which adjoins the insert section for the displacement of adhesive into the adhesive gap. The displacement section has a protrusion in the radial direction opposite the insert outer contour, which has and having a flexible, particularly an elastic design.

Here, an adhesive aid is an auxiliary device which is used for the purpose of joining by adhesion but not for remaining in the finished components joined by adhesion. For the purpose of the invention, any part of a spatial structure may be a component, irrespective of whether it is a half-finished product, a semi-finished product, a joining element, an individual layer of a laminate or the like. The adhesive aid according to the invention can particularly suitably be used for the adhesive joining of layers of a composite fiber component, such as CFRP or GFRP layers, or of components made of a composite fiber material, such as CFRP or GFRP, but can also be used for other materials, such as metal, synthetic material or wood. CFRP is a plastic material reinforced by fibers (long fibers or short fibers), generally called carbon-fiber-reinforced plastic.

For the purpose of the invention, an opening extends between two opposite sides of a component. The opening may be a bore, a punch hole or a gap and may basically have any shape. Since the insert outer contour correlates with an inner contour of the opening, the insert outer contour rests at least in sections against the inner contour of the opening such that a secure fit of the adhesive aid is ensured in the opening if the adhesive aid is used for the intended purpose. This can be achieved in that, in its cross-section, the insert outer contour corresponds to the inner contour of the opening, as required, with a certain oversize. A direction of the dimension of the opening is an axial direction and a plane transversely to the dimension direction of the opening is the cross-sectional plane. Correspondingly, a direction transversely to the axial direction (dimensional direction of the opening) is the radial direction. With respect to the opening, the thus defined directions coincide with the direction definitions with respect to the adhesive aid if the latter is used as intended.

In the axial direction, the insert outer contour may extend over the entire thickness (depth) of the first component, thus over the entire "length" of the opening, but may also be longer or shorter.

Viewed in the circumferential direction, it may also be advantageous for a continuous sealing to occur over the circumference, between the insert outer contour and the inner contour of the opening. However, for complying with a correlation, it is sufficient for the insert outer contour to be supported only at points or sections at the opening, which may take place, for example, in the case of a longitudinal ribbing of the insert section. In this case, the outermost contour sections of the insert outer contour, which can be understood to be supporting sections, define a correlation contour, which corresponds to the inner contour of the opening in the circumferential direction. In the event of an opening with a circular cross-section, which exists, for example, in the case of a bore, the correlation contour, for example, a surrounding area, in the case of an opening with an arbitrary cross-section would, for example, be a so-called "surrounding contour", which is generated, for example, by radially outermost sections of the insert outer contour. For this purpose, a protrusion opposite the insert outer contour is a protrusion opposite the correlation contour. This means that, in the radial direction, the protrusion also always protrudes to the outside beyond the inner contour of the opening, and therefore particularly also to the outside beyond the gap-side edge of the opening. As a result of the protrusion of the displacement section, the latter has a greater dimension in the cross-sectional direction (radial direction) than the insert section, particularly than the insert outer contour, and thereby also a greater dimension than the opening. The displacement section therefore takes up a space in the adhesive gap that projects in the radial direction from the edge of the opening into the adhesive gap. As a result, adhesive is also pressed away from the opening in the radial direction into the adhesive gap, or a penetrating of adhesive into the space taken up by the displacement section is prevented, whereby the edges of the opening remain reliably free of adhesive, even if the adhesive had already been applied beforehand. On the whole, the adhesive aid acts as a blockage to the adhesive; i.e. the inner contour of the opening and the outer edge of the opening remain free of adhesive. In this case, it is advantageous for the used adhesive to be of comparatively low viscosity. It is understood that the correlation of the insert outer contour with the inner contour of the opening in the axial direction has to be present at least within the opening, but is not required over the entire axial length of the opening or an axial component thickness of the first component.

As a result of the flexible formation of the displacement section, the protrusion can be compressed or deformed by the opening during the removal of the adhesive aid, so that the adhesive aid can by pulled out of the opening without damaging the edges of the component and without tearing off the protrusion. The flexible formation of the displacement section can be implemented, for example, by a flexible material, such as an elastomer or by constructive devices, such as a double-wedge arrangement or an inflatable design. Particularly, the elastic formation can also be limited to the protrusion itself or may be particularly pronounced there. It is currently preferred for the entire adhesive aid to be made of an elastomer in one piece.

The precise implementation of the protrusion will be carried out by a person skilled in the art on the basis of the dimensions and other characteristics of the components. The dimension of the protrusion and the flexibility in the area of the protrusion are preferably adapted to material characteristics of the first component in the area of the opening and to adhering characteristics of the adhesive on the components such that the adhesive aid can be removed from the opening so that edges of the opening will at least essentially remain without damage and an adhesive joining between the components remains at least essentially undamaged.

In a preferred embodiment of the adhesive aid according to the invention, a length of the displacement section is adapted to a specified thickness of the adhesive gap. In this case, the length is measured in the axial direction. The specified thickness of the adhesion gap may, for example, be determined by the characteristics of the adhesive to be used, the dimensions and the structure of the components to be joined by adhesion, as well as other parameters. During the joining of CFRP components by adhesion, the adhesive gap may have a thickness of, for example, approximately 0.1 to 0.6 mm; depending on the manner of application, adhesive gap thicknesses of up to 5 mm are also contemplated. When the length of the displacement section is equal to or greater than the specified thickness of the adhesive gap, a limit stop for a contact pressure path during a joining by adhesion is formed by the protrusion which, during joining by adhesion, is squeezed between the components, in which case, the flexibility of the protrusion can also be utilized. This is also useful for process reliability when joining by adhesion. In addition, a space that is reliably free of adhesive is also formed between the adhesive surfaces because the displacement section will then fill the adhesive gap along the entire axial length.

In a further embodiment of the adhesive aid according to the invention, the displacement section forms an axial end of the adhesive aid. In other words, the displacement section particularly has a plane face which forms an axial end of the adhesive aid. In this embodiment of the adhesive aid, adhesive connections can advantageously be established, where only the first component has an opening. When, as described above, the displacement section is at least as long as the adhesive gap is thick, the surface of the second component situated opposite the opening will also remain free of adhesive because the face of the displacement section contacts the adhesive surface of the second component and will displace the adhesive from there.

In another embodiment of the adhesive aid according to the invention, the displacement section is adjoined by a second insert section in the axial direction. In this case, the second insert section is adapted like the first insert section in a second insert outer contour to an inner contour of an opening of the second component. As a result, connections formed by adhesion, in which also the second component has an opening which, in particular, is coaxial with the opening of the first component, can be advantageously established. In this case, a penetration of adhesive also into the opening of the second component can be prevented. The adhesive aid may also have two or more displacement sections, which are each separated from one another by an insert section. This means that also more than two components can be joined by adhesion with the above-mentioned advantages.

In a further development of the adhesive aid according to the invention, the adhesive aid has a placing section adjoining the insert section and having a placing surface for a placing onto a free surface, which faces away from the adhesive surface of the first component, around the opening, preferably a length of the insert section corresponding to a thickness of the first component in the area of the opening. As a result, a process-reliable limit stop is created for the inserting of the adhesive aid into the opening, and a pressing-on of the components during the joining by adhesion can at least be partially provided also by means of the adhesive aid. Light-weight components can also be held by the adhesive aid and can be guided to the second component. This may also facilitate handling and save process steps.

In a further embodiment of the adhesive aid according to the invention, the adhesive aid has a handling section which is designed for handling the adhesive aid. In particular, the handling section is designed to adjoin the insert section or is designed together with this insert section but is definitely situated on a side of the adhesive aid facing away from the displacement section. The handling section may, for example, be attached, for example, in the shape of a shaft, by which the adhesive aid can be manually gripped. On the other hand, the handling section may also be integrated, as, for example, in the shape of an internal thread or blind hole placed in the side facing away from the displacement section or in the face of the insert section, which can permit, for example, the mounting of a tool holding fixture or the coupling with a robot arm or the like.

In a preferred embodiment of the adhesive aid according to the invention, the adhesive aid is produced completely of an elastic material, particularly a silicone or an elastomeric plastic. A completely elastic design of the adhesive aid is advantageous with respect to the process and is particularly easily produced. In particular, the adhesive aid has a one-piece design, i.e. is made from one mold. Silicone is easily and cost-effectively available as the elastic material; it has good sliding characteristics and adheres poorly to most other materials once it has been cross-linked. Instead of silicone, a different material, such as elastomeric plastics, can also be used, particularly a material adapted to the adhesive to be used. As an alternative, the use of an elastic material may be limited to defined areas, for example, the protrusion at the displacement section or the displacement section as a whole, an area of the insert section resting against the opening, or other areas.

In a further development of the adhesive aid according to the invention, the insert section has an undercut at the end adjoining the displacement section. In other words, viewed in the axial direction, the undercut is arranged between the protrusion and the insert outer contour. The undercut facilitates the handling of the adhesive aid because, when the adhesive aid is inserted, the protrusion is accommodated by the undercut and, when the adhesive aid is removed, the bending point of the protrusion is displaced radially inward. Damage to and tearing-off of the protrusion can thereby be even more easily avoided.

In a second aspect, the present invention also relates to a method of joining by adhesion a first component with a second component, at least the first component having an opening which opens into its adhesive surface. According to the invention, the method has the steps of:

a) placing the above-described adhesive aid in the opening of the first component;

b) applying a flowable adhesive to the adhesive surface of the first component and/or the adhesive surface of the second component;

c) bringing the first component and the second component onto one another with mutually facing adhesive surfaces, and preferably exerting a predefined adhesion pressure upon the first and the second component; and d) removing the adhesive aid from the opening.

For the intended use, the placing of the adhesive aid takes place such that the insert section is inserted into the opening of the first component, the displacement section of the adhesive aid projecting from the opening in the inserting direction. Preferably, the component that is provided with adhesive is the one which does not have the adhesive aid or the opening or is free of those. As a result of the use of an adhesive aid according to the invention, a method according to the invention has the same advantages as described with respect to the adhesive aid itself.

The method according to the invention is preferably implemented such that the inserting of the adhesive aid and the removal of the adhesive aid are carried out from the side of the first component facing away from the adhesive gap. This means that no opening for removing the adhesive aid has to be present in the second component, and the side of the second component facing away from the adhesive gap, in other words, the backside of the adhesive connection, does not even have to be accessible.

Other objects, advantages and novel features of the present invention will become apparent from the following detailed description of one or more preferred embodiments when considered in conjunction with the accompanying drawings.

DETAILED DESCRIPTION OF THE DRAWINGS

In the following, embodiments of the invention will be described in detail by reference to the attached drawings. In several figures, identical components are each provided with the same reference numbers. Components and characteristics, purposes and effects, which are described with respect to one embodiment, unless explicitly or obviously excluded, should be assumed to be applicable to every other embodiment and should also be considered to be disclosed with respect to the respective other embodiment, even though they are no explicitly shown and/or described there. It is further understood that the drawings are schematic and contain no restrictions with respect to concrete measurements or dimensions, unless explicitly indicated.

In the following, a method for joining components by adhesion according to a first embodiment of the present invention by use of an adhesive aid 4, which is a separate embodiment of the present invention, will be described with reference to FIGS. 1 to 5. FIGS. 1, 2 4 and 5 show process steps in the process according to an embodiment of the invention in a schematic representation, while FIG. 3 schematically illustrates the adhesive aid used in the process in further detail.

Figure 1:
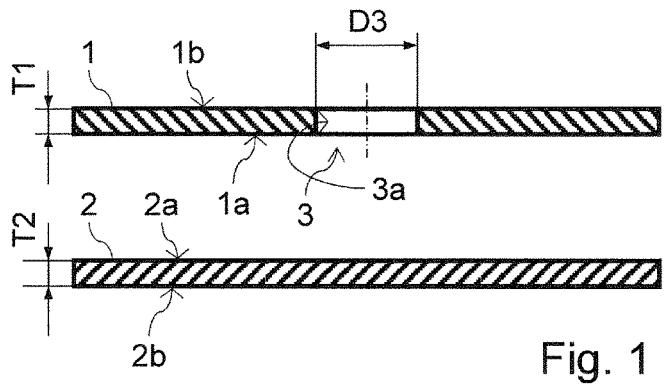
FIG. 1 is a schematic view of two components to be joined by adhesion in a step of a process according to an embodiment of the present invention.

According to FIG. 1, a first component 1 and a second component 2 are provided in a first process step. According to the representation in FIG. 1, which is a sectional view of the first component 1 and the second component 2, the first component 1 has a first surface area, which is also called an adhesive surface 1a, and a second surface area, which is also called a free surface 1b. Between the adhesive surface 1a and the free surface 1b, the first component 1 has a thickness or depth T1. Likewise, the second component 2 has a first surface area, which is also called an adhesive surface 2a, and a second surface area, which is also called a backside 2b. The second component 2 has a thickness or depth T2 between the adhesive surface 2a and the backside 2b. Furthermore, the first component 1 has an opening 3 which, in this embodiment, is a through-hole without any restriction of generality. In embodiments, which have no influence on the principle on which the present invention is based, the opening 3 may have arbitrary contour shapes, such as a square, a rectangle, another polygon with acute or round corners, or any free form. In the illustrated embodiment, the opening (through-hole) 3 has a diameter D3. A dash-dotted line in FIG. 1 symbolizes a center line of the opening (of the through-hole) 3 and defines an axial direction of the opening 3 for the views that follow. As illustrated in FIG. 1, the opening 3 connects the free surface 1b with the adhesive surface 1a of the component 1.

Figure 2:
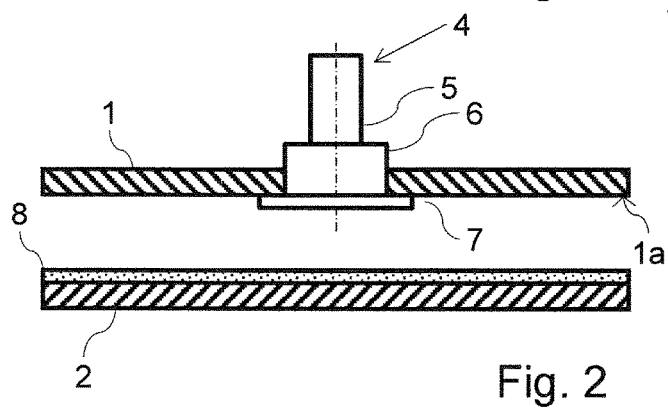
FIG. 2 is a schematic view of further steps of the process.

FIG. 2 schematically illustrates two process steps of the method according to the invention of the present embodiment. On the one hand, an adhesive 8 was applied to the adhesive surface 2a (not marked here in detail) of the second component 2. On the other hand, an adhesive aid 4 was inserted in the opening 3 (not marked here in detail) of the first component, which adhesive aid 4 will be described in greater detail in the following.

Figure 3:
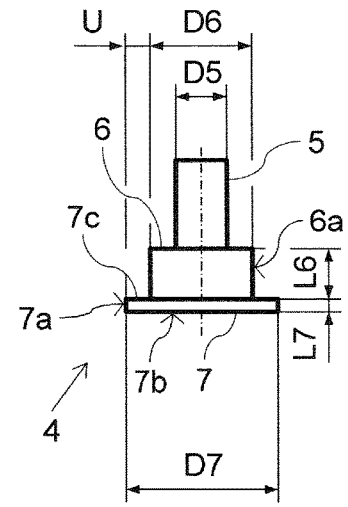
FIG. 3 is a schematic view of an adhesive aid according to an embodiment of the present invention, for use in the process.

The adhesive aid 4 schematically illustrated in FIG. 2 is shown again in detail in FIG. 3. The view in FIG. 3 contains the marking of respective sections and surface areas of the adhesive aid 4. According to the representation in FIG. 3, the adhesive aid 4 has a handling section 5, an insert section 6 and a displacement section 7 which adjoin one another in the axial direction. In the present embodiment, sections 5, 6 and 7 are cylindrical coaxial sections, which each have different diameters. More precisely, the handling section 5 has a diameter D5; the insert section 6 has a diameter D6, which is greater than the diameter D5 of the handing section 5; and the displacement section 7 has a diameter D7, which is greater than the diameter D6 of the insert section 6. Furthermore, the insert section 6 has a length L6 and the displacement section 7 has a length L7, the lengths each being measured in the axial direction (direction of the dash-dotted center line). A surface of the insert section 6, which is on the outside in the radial direction, is also called an outer contour 6a of the insert section 6 or an insert outer contour 6a, and a circumferential surface of the displacement section 7, which is on the outside in the radial direction, is also called an outer contour 7a of the displacement section 7 or a displacement outer contour 7a. The adhesive aid 4 ends in the axial direction with a face 7b of the displacement section 7. The part of the displacement section 7, which projects in the radial direction beyond the diameter D6 of the insert section 6, is also called a protrusion 7c, and a radial distance between the insert outer contour 6a and the displacement outer contour 7a is also called a protrusion dimension U.

FIG. 2 above indicates that the adhesive aid 4 is inserted via its insert section 6, which is the center section 6 of the three sections 5, 6 and 7, in the opening 3 of the first component 1, while the displacement section 7 of the adhesive aid 4 rests against the adhesive surface 1a of the first component 1.

Figure 4:
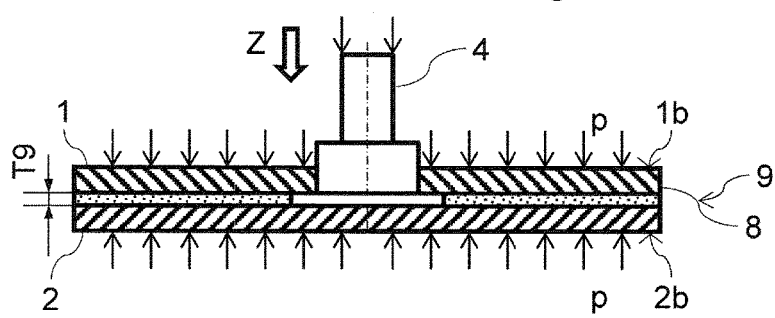
FIG. 4 is a schematic view of further steps of the process.

FIG. 4 schematically illustrates two additional process steps of the method according to the invention of this embodiment. On the one hand, the first component 1 is moved by means of the adhesive aid inserted into the opening 3 towards the second component 2 in an adhesion direction Z such that the adhesive surface 1a (not marked here in detail) approaches the adhesive applied to the adhesive surface 2a of the second component 2. Then, as illustrated in FIG. 4 by two counter-parallel groups of arrows, a pressure p is exerted on the free surface 1b of the first component 1, the adhesive aid 4 and the backside 2b of the second component 2. As illustrated in FIG. 4, under the effect of the pressure p, the first component 1 and the second component 2 approach one another to such an extent that the adhesive 8 arranged below the face 7b (see FIG. 3) of the adhesive aid 4 is displaced by the displacement section 7, and the face 7b comes to rest against the adhesive surface 2a of the second component 2. By means of this resting or contacting of the face 7b on the adhesive surface 2a of the second component 2, the contact pressure path is limited in the Z direction, and the adhesive 8 forms an adhesive gap 9 of a thickness T9. The length L7 of the displacement section 7 of the adhesive aid 4 corresponds to the thickness T9 of the adhesive gap 9 with a slight excess, so that a certain squeezing of the protrusion 7c takes place. Simultaneously, since the insert outer contour 6a correlates with the interior wall (inner contour) of the opening 3 such that the outside diameter D6 of the insert section 6 corresponds to the diameter D3 of the opening 3 with a certain excess, adhesive 8 is prevented from entering the opening 3 and being displaced beyond the opening 3 onto the free surface 1b of the component 1.

Figure 5:
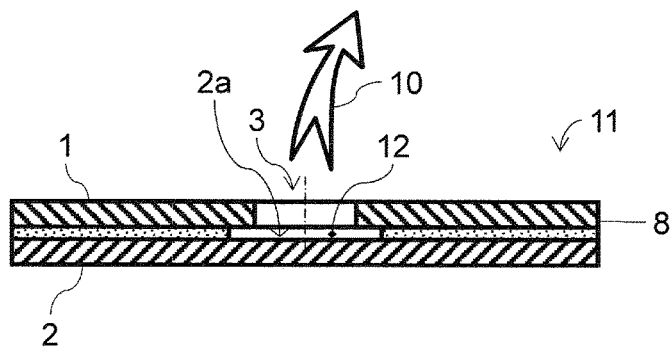
FIG. 5 is a schematic view of further steps of the process.

FIG. 5 schematically illustrates a further process step of the method according to the invention. Specifically, according to the representation in FIG. 5, the adhesive aid 4 (not shown here in detail) was removed, which is symbolized by an arrow 10. The result of this process is a layered body 11 with a first component (a first layer) 1, a second component (a second layer) 2 and a layer of an adhesive 8 arranged in-between. In the area 3 of the opening 3 of the first component 1, no adhesive 8 is present between the components 1, 2. Rather, a vacant space 12 is formed where the displacement section 7 of the adhesive aid 4 had been situated. In the area of the vacant space 12, the adhesive surface 2a of the second component 2 is also free of adhesive.

It should be noted that, according to the representation in FIGS. 2 to 4, the insert section 6 has a length L6, which is greater than the thickness T1 of the first component 1. However, this is not absolutely necessary, but provides the adhesive aid 4 with increased stability.

Without limiting generality, the adhesive aid 4 of this embodiment is completely and in one piece produced from an elastomer, such as silicone. Without limiting generality, the dimensions indicated in the embodiment, in a practical application, may amount to T1=T2=3 mm, T9=L7=0.3 mm, D3=D6=6 mm (nominal dimension), D7=6.4 mm, D5=4 mm, L6=5 mm.

Figure 6:
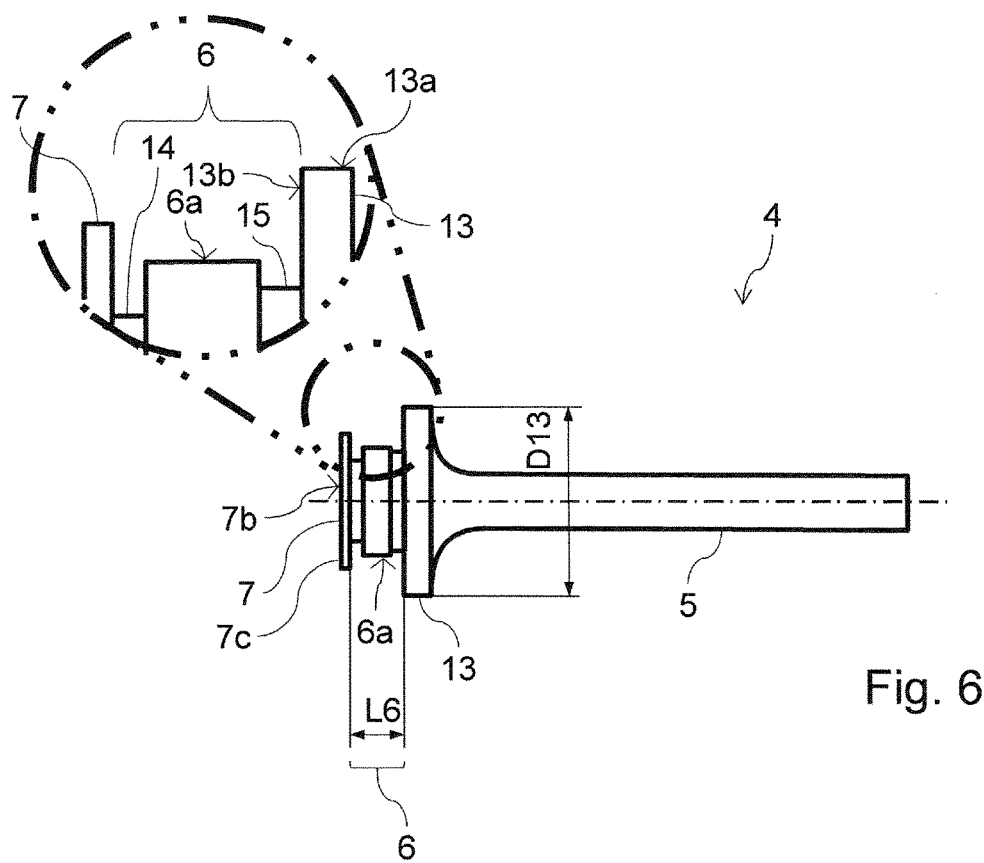
FIG. 6 is a schematic view of an adhesive aid according to a further embodiment of the present invention.

FIG. 6 is a schematic representation of an adhesive aid 4 according to a further embodiment of the present invention. The adhesive aid 4 of the present embodiment is a further development or modification of the adhesive aid 4 of FIG. 3 and, like the latter, has a handling section 5, an insert section 6 and a displacement section 7. In addition, a placing section 13 is designed between the insert section 6 and the handling section 5. The placing section 13 has a diameter D13, which is greater than the diameters of the handling section 5, the insert section 6 and the displacement section 7 and, as a continuation of the practical application without limiting generality, is D13=10 mm. The placing section 13 is provided for being placed on the free surface 1b of the first component 1 illustrated in FIG. 1 when the adhesive aid 4 is inserted in the opening 3. In the case of the adhesive aid 4 of this embodiment, the length L6 of the insert section 6 is adapted to the thickness T1 of the first component 1 such that the first component 1 is accommodated between the displacement section 7 and the placing section 13 when the adhesive aid 4 is inserted into the opening 3. In other words, in this modification, the length L6 of the insert section 6 corresponds approximately to the thickness T1 of the first component 1.

As even more clearly illustrated in an enlarged detail of a dash-doubled-dotted contour in FIG. 6, the insert section 6 has a first undercut 14 which adjoins the displacement section 7, and a second undercut 15, which adjoins the placing section 13. The first undercut 14 provides the displacement section 7 with a greater flexibility during the insertion and removal of the adhesive aid 4. In other words, during the insertion of the adhesive aid 4 into the opening of the first component 1 (see FIG. 1), the protrusion 7c of the displacement section 7 can be compressed and bent such that it is accommodated in the first undercut 14. This reduces the loading of the protrusion 7c of the displacement section 7 and avoids possible damage which could impair the function of the displacement section 7. The second undercut 15 provides the insert section 6 with a greater flexibility and thereby also facilitates the handling of the adhesive aid. The second undercut 15 is less deep than the first undercut 14. Without limiting generality, the depth of the first undercut 14 may amount to approximately 2 mm, and the depth of the second undercut 15 may amount to approximately 1 mm. Although the undercuts 14, 15 are illustrated in the figure with cylindrical outer contours, the undercuts 14, 15 may also have contours which conically taper toward the displacement section.

Figure 7:
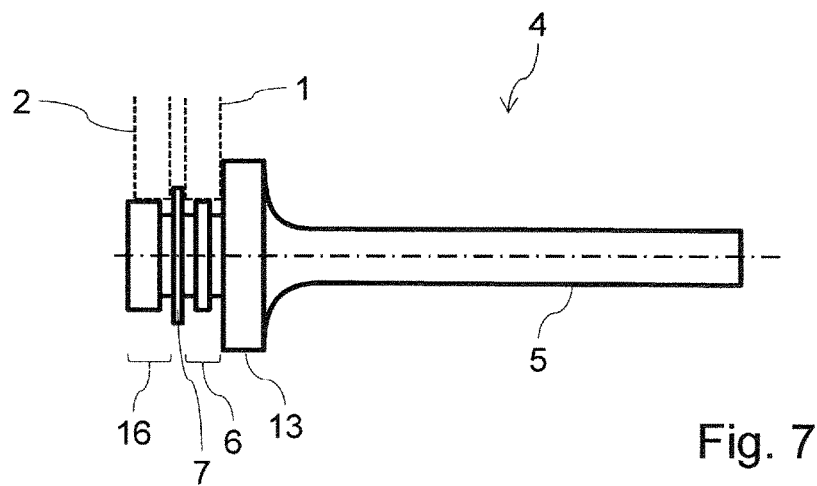
FIG. 7 is a schematic view of an adhesive aid according to a still further embodiment of the present invention.

FIG. 7 is a schematic representation of an adhesive aid 4 of a further embodiment of the present invention. The adhesive aid 4 of this embodiment is a modification of the adhesive aid 4 of the preceding embodiment (FIG. 6) and differs from the latter in that a second insert section 16 adjoins the displacement section 7. As indicated in FIG. 7 by broken lines, the second insert section 16 is used for the insertion into an opening of the second component 2. In other words, by way of the adhesive aid 4 according to the embodiment of FIG. 7, it becomes possible to also join components by adhesion which each have an opening, in which case, a penetration of adhesive into the respective opening and beyond can be prevented. The second insert section 16 advantageously has a length which is greater than or equal to the thickness T2 of the second component 2, in order to reliably transport adhesive, which is possibly carried along during the insertion, beyond the opening of the second component 2.

In further modifications, additional displacement and insert sections may follow in order to join still further components or layers of a layered body by adhesion in one processing step.

The above-described adhesive aids according to the currently preferred embodiments are produced from a flexible, particularly elastic material, in the present case, of silicone, without limiting generality. Silicone has the advantage that it does not adhere to most materials and can also easily and without residue be detached from a liquid or flowable adhesive after its hardening. Furthermore, silicone is very flexible and nevertheless has sufficient inherent stability in order to prevent a tearing-off or tearing-out of the protrusion 7c of the displacement section 7 during the insertion or removal of the adhesive aid 4.

The invention was described above and illustrated in the figures by way of preferred embodiments, variants, alternatives and modifications. These descriptions and representations are purely schematic and do not limit the scope of protection of the claims but are used only to illustrate examples. It is understood that the invention can be implemented and modified in multiple manners without leaving the scope of protection of the claims.

For example, it is not absolutely necessary that the length L7 of the displacement section 7 corresponds to the thickness T9 of the adhesive gap 9 with an excess. The length L7 of the displacement section 7 can correspond precisely to the thickness T9 of the adhesive gap 9 or may be less, if a complete displacement of the adhesive from the adhesive surface 2a of the second component 2 is not important.

Also, the insert section 6 does not have to completely (closely) rest with its outer contour 6a against the inner contour 3a of the opening 3, if the effect of the displacement section 7 effectively prevents an entering of adhesive into the opening 3. In this case, it is sufficient for the outer contour 6a of the insert section 6 to rest against the inner contour 3a of the opening 3 to such an extent that the adhesive aid 4 is securely disposed in the opening 3.

Furthermore, for component pairings, in which the first component 1 as well as the second component 2 have an opening, instead of the second insert section 16, a second adhesive aid may be provided which has only an insert section but no displacement section, and which is inserted from the backside 2b in order to close the opening in the second component 2 for the duration of the joining by adhesion. In this case, the second adhesive aid is preferably inserted first in order to avoid that adhesive is pushed by the adhesive aid 4 into the opening in the second component 2.

In addition, pressure p is exerted in the embodiment upon the free surface 1b of the first component 1, the adhesive aid 4 and the backside 2b of the second component 2. It may be advantageous for the adhesive aid 4 to be excluded from the compression loading.

Instead of silicone, different silicone-type materials and elastomeric plastics may also be used, and the adhesive aid may also be produced from materials that differ in sections.

LIST OF REFERENCE SYMBOLS

1 First component
1a Adhesive surface
1b Free surface
2 Second component
2a Adhesive surface
2b Backside
3 Opening
3a Inner contour
4 Adhesive aid
5 Holding section
6 Insert section
6a Insert outer contour
7 Displacement section
7a Displacement outer contour
7b Face
7c Protrusion
8 Adhesive
9 Adhesive gap
10 Removal of adhesive aid
11 Layered body
12 Vacant space
13 Placing section
13a Outer contour
13b Placing surface
14 Undercut
15 Undercut
16 Second insert section
D$_k$ Diameter of an element k
L$_k$ Length of an element k
T$_k$ Thickness (strength) of an element k
U Extent of protrusion
Z Direction of joining by adhesion (feeding direction; thickness direction)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An adhesive aid for use during adhesive joining of first and second components via an adhesive situated in an adhesive gap between respective adhesive surfaces of the first and second components, at least the first component having an opening that opens to the adhesive surface of the first component, the adhesive aid comprising:
   an insert section configured to be inserted into the opening, the insert section having an insert outer contour that corresponds with an inner contour of the opening;
   a displacement section adjoining the insert section, the displacement section being configured to displace the adhesive in the adhesives gap, wherein the displacement section has a protrusion which protrudes past the insert outer contour in a radial direction, and the displacement section is flexible at least in an area of the protrusion.

2. The adhesive aid according to claim 1, wherein the displacement section is elastic at least in the area of the protrusion.

3. The adhesive aid according to claim 1, wherein a length of the displacement section is adapted to a defined thickness of the adhesive gap.

4. The adhesive aid according to claim 1, wherein the displacement section forms an axial end of the adhesive aid.

5. The adhesive aid according to claim 2, wherein the displacement section forms an axial end of the adhesive aid.

6. The adhesive aid according to claim 1, wherein the adhesive aid further comprises a second insert section adjoining the displacement section in the axial direction.

7. The adhesive aid according to claim 1, wherein the adhesive aid further comprising two or more displacement sections, each of said two or more displacement sections being separated from one another by a respective insert section.

8. The adhesive aid according to claim 1, wherein the adhesive aid further comprises:

a placing section adjoining the insert section, the placing section having a placing surface to be placed onto a free surface of the first component, the free surface of the first component facing away from the adhesive surface of the first component, and the placing section being placed around the opening.

9. The adhesive aid according to claim 8, wherein a length of the insert section corresponds to a thickness of the first component in the area of the opening.

10. The adhesive aid according to claim 1, wherein the adhesive aid further comprises a handling section configured for handling of the adhesive aid.

11. The adhesive aid according to claim 10, wherein the handling section adjoins the insert section.

12. The adhesive aid according to claim 1, wherein the adhesive aid is made completely of an elastic material.

13. The adhesive aid according to claim 12, wherein the elastic material is silicon or an elastomeric plastic.

14. The adhesive aid according to claim 12, wherein the adhesive aid is made in one piece.

15. The adhesive aid according to claim 1, wherein the insert section has an undercut at an end adjoining the displacement section.

16. The adhesive aid according to claim 8, wherein the insert section has an undercut at an end adjoining the displacement section.

17. A method of joining adhesively a first component with a second component, at least the first component having an opening that opens to an adhesive surface of the first component, the method comprising the acts of:

placing an adhesive aid according to claim 1 in the opening of the first component;

applying a flowable adhesive to the adhesive surface of the first component and/or an adhesive surface of the second component;

placing the first component and the second component together with the respective adhesive surfaces thereof facing one another; and removing the adhesive aid from the opening.

18. The method according to claim 17, further comprising the act of exerting a predefined adhesion pressure upon the first and second components upon placing the components together.

19. The method according to claim 18, wherein the act of inserting the adhesive aid and the act of removing the adhesive aid are carried out from a side of the first component that faces away from the adhesive gap.

20. The method according to claim 17, wherein the act of inserting the adhesive aid and the act of removing the adhesive aid are carried out from a side of the first component that faces away from the adhesive gap.

* * * * *